Aug. 12, 1924.
L. STOFFERSEN
1,504,391
CLUTCH PEDAL DETENT FOR TRACTORS
Filed Nov. 11, 1922
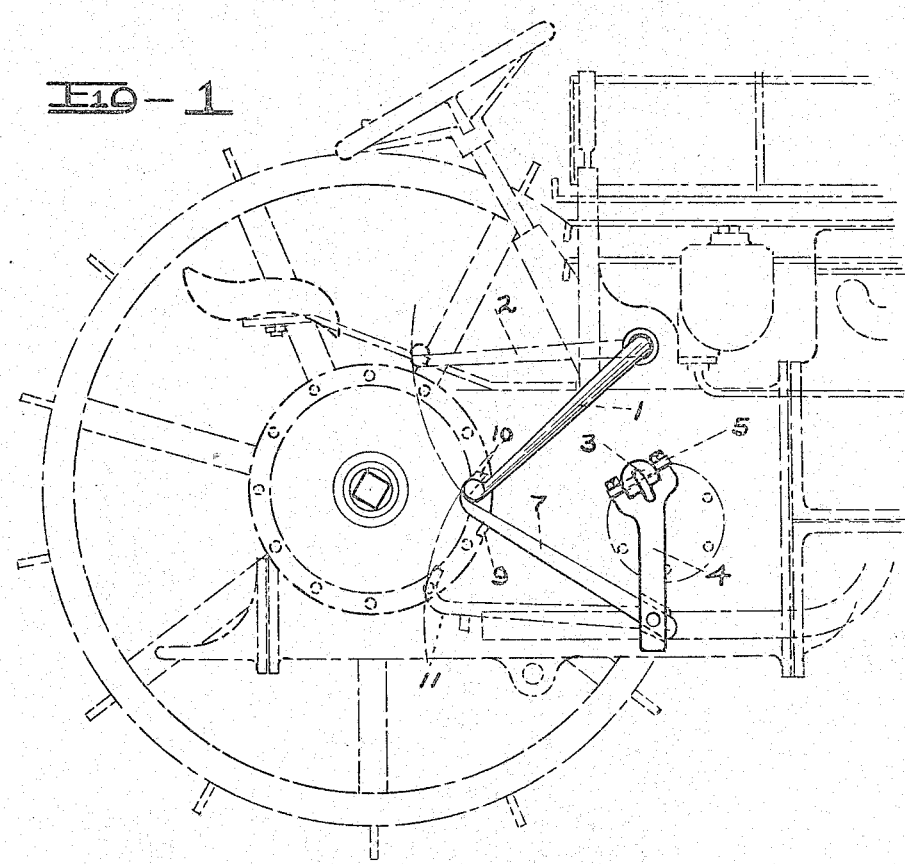
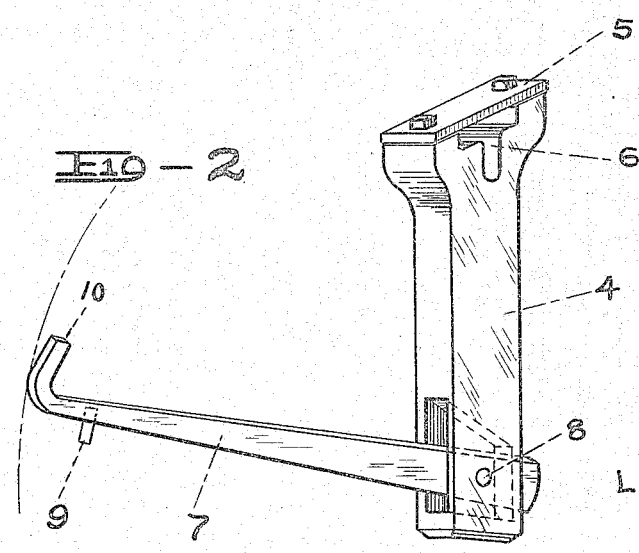
INVENTOR
LINUS STOFFERSEN
BY J. L. Rivers
ATTORNEY Patented Aug. 12, 1924.

1,504,391

UNITED STATES PATENT OFFICE.

LINUS STOFFERSEN, OF SEATTLE, WASHINGTON.

CLUTCH-PEDAL DETENT FOR TRACTORS.

Application filed November 11, 1922. Serial No. 600,192.

*To all whom it may concern:*

Be it known that I, LINUS STOFFERSEN, a subject of the King of Denmark, residing at Seattle, in the county of King and State of Washington, have invented a new and useful Clutch-Pedal Detent for Tractors, of which the following is a specification.

In operating tractors for power purposes the clutch mechanism, controlling the usual belt pulley, has a tendency to become somewhat clogged with congealed lubricating material; this being especially noticeable in the morning after the tractor has stood unused during the night. The effect of this is to greatly increase the exertion necessary to crank up and start the engine, and my invention has reference to a simple device, operable from the side of the machine, whereby the clutch will be released and maintained in released position to facilitate the starting of the engine, and to lessen the labor required therefor. With said object in view, I provide a hooked arm suitably mounted on the tractor and adjacent the clutch pedal by which said pedal can be easily placed and kept in lowered position, thereby breaking the clutch while the engine is being started, and then instantly released to throw the pedal back to normal position.

In the accompanying drawing I illustrate an embodiment of my invention, wherein—

Figure 1 is a view of the device attached to the foot bracket of a Fordson tractor and in locked engagement with the clutch pedal thereof.

Fig. 2, a perspective of the same detached from the tractor.

Referring more particularly to the drawing, 1 denotes the clutch pedal of the tractor as maintained in lowered position by this device, the dotted lines 2 indicating the normal position of said pedal. 3 designates a foot bracket of the tractor, to which the body 4 is attachable through the clamp 5 and the opening 6 in the adjacent end of the body. This opening, as it will be noted, is in form complementary to the lower periphery of said bracket. An arm 7 is pivotally connected with the other end of the body, as shown at 8. Said arm carries the projection 9, against which the hand of the operator is designed to rest in manipulating the arm, and terminates in a hook 10, adapted to engage the clutch pedal and maintain it in lowered position as shown in Fig. 1. 11 denotes, obviously, the position of the arm when unhooked from the pedal.

In utilizing the device, the end of the body 6 is mounted to the end of the foot bracket 3, and the clamp 5 is then bolted tight, thus securing it in position for use. With one hand the operator lowers the clutch pedal 1, and grasping the arm 7, preferably adjacent the projection 9 to afford a better purchase, raises the hook 10 and engages the same with the pedal as illustrated in Fig. 1. The clutch being then released permits the user to crank up the engine and get it started with a minimum effort. As is evident, the device can be unlocked from the clutch pedal by unhooking the arm therefrom by hand, or by a slight pressure of the foot on said pedal, and the tractor is ready for use in the usual way. When the arm is thus idle it occupies the position illustrated by 11 in Fig. 1, and in no way interferes with the free use of the tractor.

The device is particularly designed to be manipulated from the side of the tractor, and is so located as to be conveniently accessible to the driver when off of the machine and ready to crank up the engine. While it can be applied or released from the seat, its primary function is to afford quick and positive means for releasing the clutch and holding it in such position in the way and for the purpose heretofore described.

For the purpose of describing the device I have shown it as applied to a Fordson tractor. As will be obvious to those skilled in the art it can as well be made applicable to tractors of other makes and still be within the spirit of my invention.

I claim:

In a motor tractor having means, including a pulley, for communicating power to other mechanism, a clutch controlling pedal, and a foot bracket located adjacent the pedal, the combination of an elongated body portion having at one end a recess in form adapted to embrace said bracket, the other end adapted to extend, when in operative position, below the pulley, a clamp mounted to said recessed end, an arm pivotally connected with the other end of the body and adapted to idle below the pulley, and a hook at the free end of the arm, extending upwardly and approximately at right angles thereto, adapted to engage the pedal and maintain the clutch mechanism in released position.

LINUS STOFFERSEN.